United States Patent [19]

Kyuchukov

[11] 4,371,432

[45] Feb. 1, 1983

[54] METHOD OF AND APPARATUS FOR ELECTROEROSIVE PRODUCTION OF PROFILED SURFACES

[75] Inventor: Yanko P. Kyuchukov, Varna, Bulgaria

[73] Assignee: UPZ kam Vimmess, Russe, Bulgaria

[21] Appl. No.: 238,125

[22] Filed: Feb. 25, 1981

[51] Int. Cl.³ .................. B23P 1/04; B23P 1/12; B23K 9/16
[52] U.S. Cl. .................. 204/129.35; 204/224 M; 204/225; 204/206; 219/69 W
[58] Field of Search ............. 204/129.35, 206, 224 M, 204/225; 219/69 W

[56] References Cited

U.S. PATENT DOCUMENTS 3,642,601 2/1972 Kondo ........................... 204/206

FOREIGN PATENT DOCUMENTS

| 144178 | 8/1948 | Australia | 204/129.35 |
| 526365 | 9/1972 | Switzerland | 219/69 W |
| 776172 | 6/1957 | United Kingdom | 219/69 W |
| 695795 | 11/1979 | U.S.S.R. | 219/69 W |

Primary Examiner—Donald R. Valentine

[57] ABSTRACT

Method of and apparatus for producing shaped surfaces on workpieces by electroerosion at a machining zone. A continuous wire electrode having a first, initial cross-section is fed toward the machining zone, and while it is thus fed the electrode is deformed to a second, desired cross-section before it reaches the machining zone, the second cross-section being complementary to the shape of the surface to be machined into the workpiece.

5 Claims, 5 Drawing Figures

FIG. I

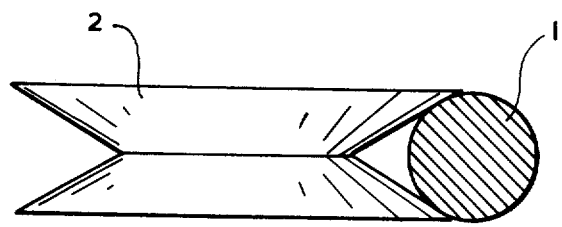
F I G. 3
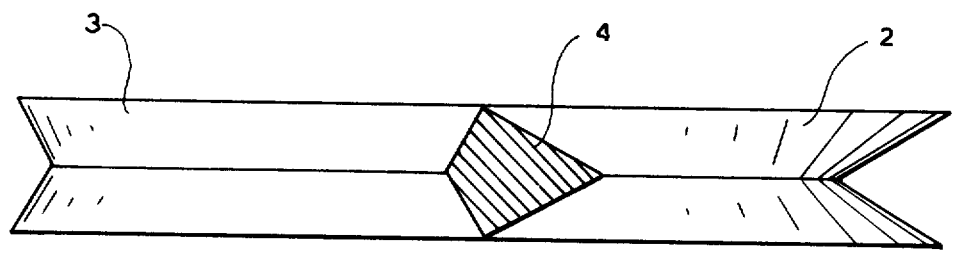
F I G. 4
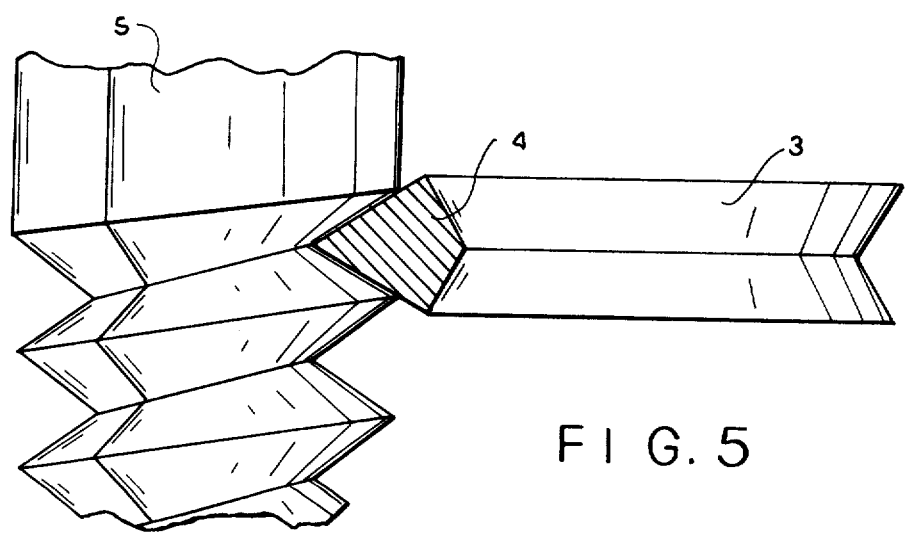
F I G. 5

METHOD OF AND APPARATUS FOR ELECTROEROSIVE PRODUCTION OF PROFILED SURFACES

This invention relates to a method of and an apparatus for electroerosive production of profiled surfaces, particularly surfaces of small size.

There are known a method of and an apparatus for electroerosive production of small-sized profiled surfaces by copying the profile of a specially made electrotool. The geometric shape and the sizes of the working portion of the electrode-tool are transferred to the surface of the article being shaped or machined.

A drawback of such known methods and apparatus lies in the impossibility of maintaining a constant profile or shape of the electrode-tool during the electroerosive operation.

Another known method of and apparatus for electroerosive production of small-sized profiled surfaces involve the generation of the profile by a continuously delivered wire electrode of round cross-section.

A drawback of such latter methods and apparatus lies in that their productivity is lower as compared with the method of and apparatus for copying the profile of a specially made electrode-tool.

It is therefore a general object of the present invention to avoid the aforementioned drawbacks of the prior art by providing a method and an apparatus for electroerosive production of profiled surfaces, particularly those of small size, the method and apparatus of the invention making it possible to maintain a constant profile of the electrode-tool during the electroerosive shaping operation, and thus achieving maximum productivity.

The gist of the method of the invention lies in that immediately before the zone of machining the workpiece the wire electrode is profiled to a shape corresponding to the final profile of the machined surface.

The apparatus by which such method is carried out comprises a spindle unit with a drive, the spindle and drive being mounted upon a base table. On this base table there are also disposed a longitudinally movable table with a slide for angularly positioning a guiding transversely movable table, and a longitudinal and a transverse slide mounted on the transversely movable guiding table.

It is a feature of the apparatus of the invention that upon the transverse slide there is mounted a basic mechanism which comprises a profiled driving roll and a profiling pressing roll cooperating therewith, guiding elements such as rolls being disposed on both sides of the roll pass between the profiled driving roll and the profiling pressing roll. The apparatus includes a feed spool for a round wire electrode and a take-up spool for the profile electrode, all of the above mentioned rolls of the apparatus being preferably disposed parallel to each other.

The advantage of the method and apparatus of the invention lies in the possibility of maintaining constant the profile of the electrode-wire, thus achieving a high productivity and precision of the profile of the machined or electroeroded workpiece.

For a better understanding of the invention, reference should be made to the accompanying drawings in which there is illustrated a preferred embodiment of the invention.

In the Drawings:

FIG. 3 is a fragmentary view in section of the basic mechanism of the apparatus, such section being taken along the line 3—3 in FIG. 2;

Figure 2:
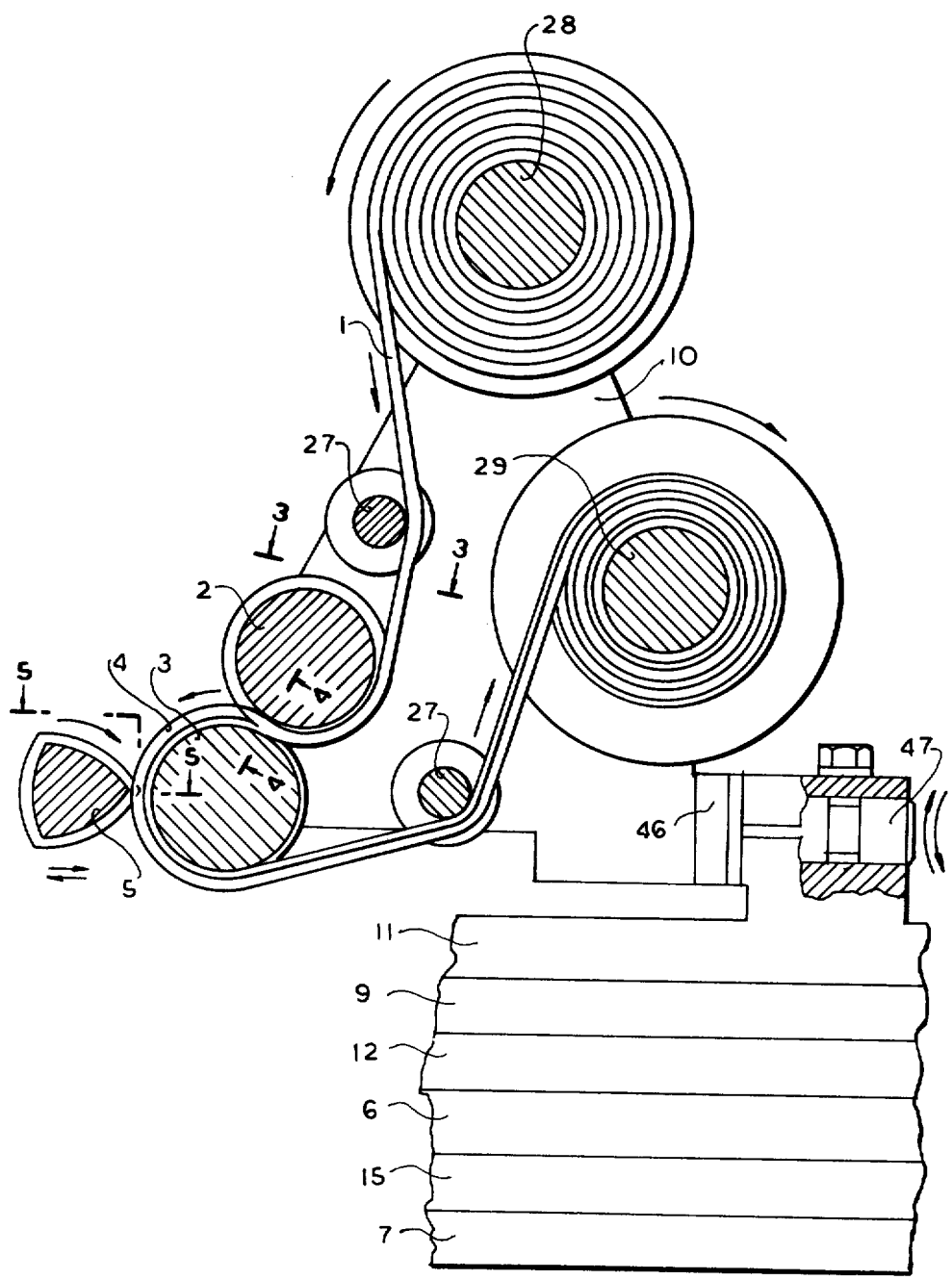
FIG. 2 is a schematic view in end elevation of the basic mechanism of the apparatus.

FIG. 4 is a fragmentary view in section of a further portion of the basic mechanism of the apparatus, such section being taken along the line 4—4 in FIG. 2; and FIG. 5 is a still further fragmentary view in cross-section of a portion of the basic mechanism of the apparatus, such view also including a fragmentary view in plan of the workpiece being machined or electro-eroded by the apparatus of the invention.

Figure 1:
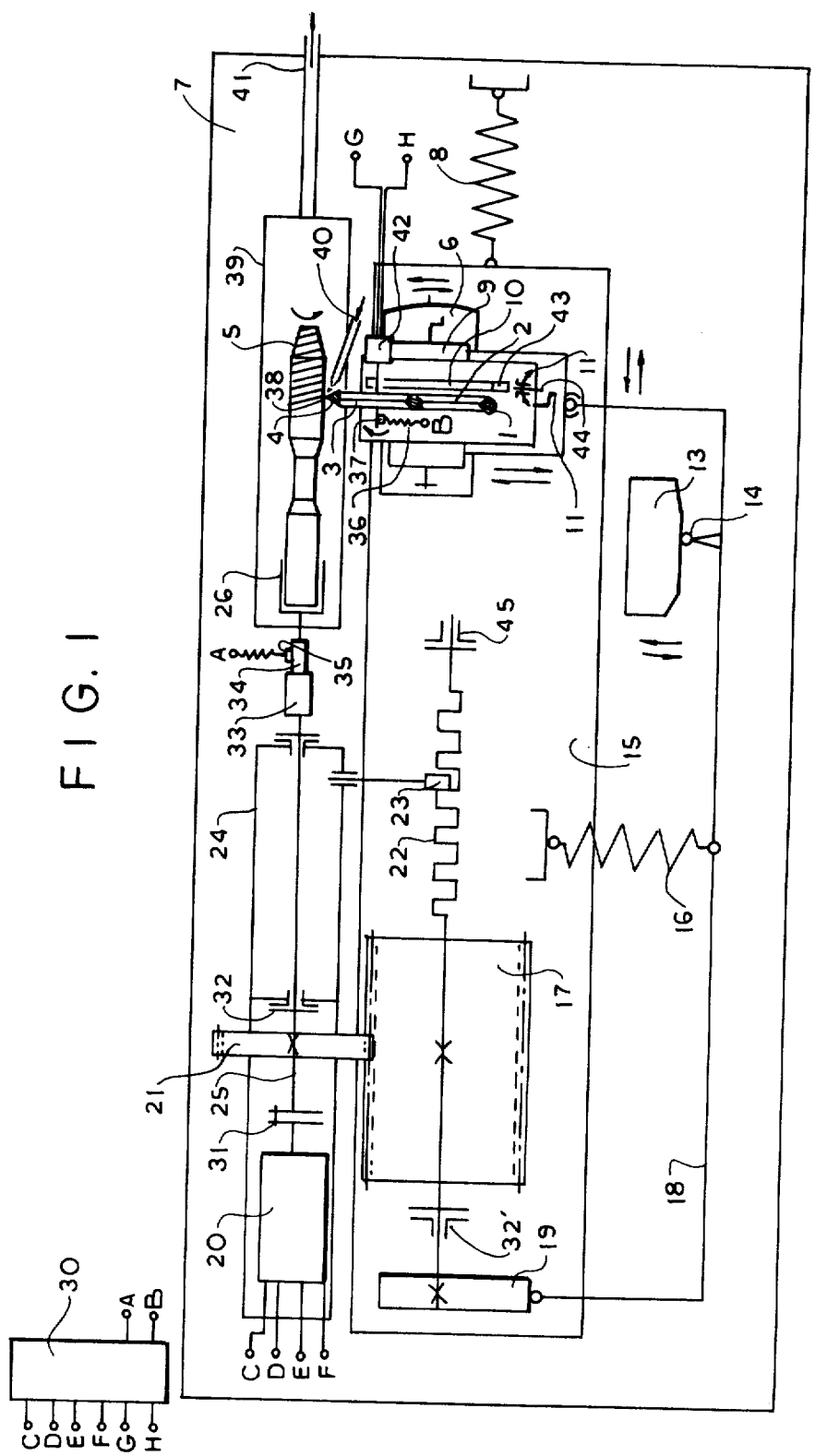
FIG. 1 is a schematic view in plan of such preferred embodiment of the apparatus.

Turning first to FIG. 1, the apparatus of the invention comprises a base table 7, on which there is mounted and affixed a driving mechanism shown as an electric motor 20. Motor 20 is connected by a serially connected coupling 31 to a longitudinally extending spindle 25 which is mounted in suitable bearings, as indicated. Fixedly mounted upon spindle 25 beyond the coupling 31 there is a narrow pinion 21. Downstream of pinion 21 there is a clutch 32; the outer end of the spindle 25 bears a chuck 26 for gripping a workpiece 5 to be shaped. Pinion 21 is in constant mesh with an elongated pinion 17 which is rigidly fixed to the end of a screw 22 which is rotatably mounted in a suitable bearing 45 upon a table 15 which is reciprocable lengthwise upon the base table 7. The left hand end of the screw 22 is connected by means of a clutch 32' to a changeable cam 19. A guide 23, which is fastened rigidly at one end to a housing 24 affixed to the base table 7 has its lower (FIG. 1) end engaged into the threads of the screw 22 as shown. A coil tension spring 8 extending between the base table 7 and the right hand end of the reciprocable table 15 constantly maintains the guide 23 in engagement with the right hand flanks of the screw 22.

Upon the longitudinally movable table 15 there is disposed a slide 6 which is capable of angular adjustment, a transversely movable table 12 carrying a longitudinally movable slide 9 being mounted upon the angularly adjustable slide 6. Upon the longitudinally mounted slide 9 there is disposed a transverse slide 11, to which there is attached a basic mechanism 10. Mechanism 10 is shown generally in FIG. 1, and in more detail in FIG. 2.

The basic mechanism 10 comprises a profiling drive roll 3 and a profiling pressing roll 2, roll 2 being shown in detail in FIG. 3, roll 3 being shown in detail in FIGS. 4 and 5, and the electrode wire forming roll pass between rolls 2 and 3 being shown in FIG. 4.

Turning now to FIG. 2, there are there shown a feed spool 28 for the initially round electrode wire 1, and a take-up spool 29 for the profiled electrode wire 4. A guide roll 27 is disposed upstream of the profiling pressing roll 2, and a similar guide roll 27 is disposed downstream of the profiling drive roll 3.

Returning to FIG. 1, on the base table 7 there is rigidly affixed a templet 13, the templet guiding a templet-follow up 14 which is affixed to a linkage 18 which connects a cam follower cooperating with the changeable cam 19 and the transverse slide 14, thereby to determine the transverse motion of the slide 12. A coil tension spring 16 is disposed between the table 15 and the linkage 18, whereby to cause the follower 14 to remain in engagement with templet 14.

The driving means for the profiling or shaping of the electrode wire 4 for carrying out the electro-erosive treatment is shown in FIG. 1 as a driving mechanism 42 with an electric supply from generator 30 at terminals G and H thereof. The connection between the profiled electrode wire 4 and the electric generator 30 is carried out at terminal B through a friction spring brush or contact 36 to the shaft 37 of the basic drive roll 3. The connection between the workpiece 5 and the electric generator 30 is carried out at terminal A through a friction spring brush or contact 35 to a current-removing slip ring 34, fixed to the spindle 25. Electric insulation of the workpiece 5 from the profiled electrode wire 4 is provided by means of an insulator 33 which divides spindle 25, and an insulator 43, isolating the basic mechanism 10 with the electrode-wire 1 from the drive shaft 44 for other elements of the whole device.

After the passing of the initial wire electrode with round section 1 between the profiling pressing rolls 2 and 3, it is formed as profiled electrode wire 4, and as shown it is mounted on the drive roll 3. The electro-erosive treatment is carried out through cutting the profiled wire 4 into the workpiece 5.

Dielectric 38 is fed between the profiled flexible wire electrode 4 and the workpiece 5 through a pipeline 40 and falls into a tank 39 from which it is discharged through a pipeline 41.

It is known that as the electrolyte with which electro-erosive treatment can be carried out there may be used machine oil, gas, water, etc., depending on the current supply 30 used and the character of the workpiece 5.

The above-described apparatus operates as follows:

A workpiece 5, here shown as a circular cylindrical article to be threaded by an electro-erosive operation, is mounted in the chuck 26 and the driving mechanism 20 is placed in operation. There then follows, with respect to the workpiece 5, an adjustment which determines the position of the profiled wire electrode 4. The adjustment is effected by means of the angularly adjustable slide 6, the adjustment of the longitudinal slide 9, and the adjustment of the transverse slide 11.

In the basic mechanism 10 there are inserted the necessary profiled driving roll 3 on the profiling pressing roll 2, as well as a round wire electrode 1 of suitable diameter. After switching-on the drive (not shown) for the profiling drive roll 3, the electrode wire which passes through the roll pass between the rolls 2 and 3 is shaped or profiled, and copies its profile on the workpiece 5, after cooperating with the workpiece 5 the profiled electrode 4 then being wound up on the takeup spool 29.

When the driving mechanism 20 has been turned on, there are brought into rotation the spindle 25 with the narrow pinion 21, the latter driving the broad gear 17 with which it is constantly in mesh, and also driving the screw 22 and the cam 19. The workpiece 5 is rotated, while to the profiled wire electrode 4 there is imparted a transverse and a longitudinal motion with respect to the workpiece 5, depending upon the shapes of the cam 19 and the templet 13 which are employed during such operation. The simultaneous use of cam 19 and templet 13 makes it possible to machine components of complex geometric shapes.

The method and apparatus of the invention can be used in the forming of both internal and external threads, the production of chip-less taps, the cutting of worms, etc.

Although the invention is illustrated and described with reference to one preferred embodiment thereof, it is to be expressly understood that it is in no way limited to the disclosure of such a preferred embodiment but is capable of numerous modifications within the scope of the appended claims.

I claim:

1. An apparatus for the production of shaped surfaces or workpieces by electroerosion machining at a machining zone, comprising means for feeding a continuous wire electrode having a first, initial cross-section toward the machining zone, and means for deforming the electrode to a second, desired final cross-section while it is being thus fed and before it reaches the machining zone, said apparatus further comprising a base table, a spindle unit with drive for supporting and rotating the workpiece, longitudinally and transversely movable tables and slides for adjustment of the electrode and the workpiece relative to each other at the machining zone, and a basic mechanism attached to the transverse slide, said basic mechanism comprising a profiling driving roll and profiling pressing roll, said rolls cooperating to form a roll pass for changing the electrode from its first shape to its second shape.

2. An apparatus according to claim 1, comprising electrode guiding means disposed both upstream and downstream of the roll pass.

3. An apparatus according to claim 2, wherein the electrode guiding means each comprises a roll.

4. An apparatus according to claim 1, comprising a feed spool for the electrode disposed upstream of the roll pass, and a take-up spool for the electrode disposed downstream of the machining zone, both spools being disposed on the basic mechanism.

5. A method for the production of shaped surfaces or workpieces by electroerosive machining at a machining zone, comprising feeding a flexible continuous round wire electrode toward the machine zone, and deforming the initially round electrode in a roll pass while it is being continuously fed to a second shape in cross-section having at least one angle while it is being thus fed and before it reaches the machining zone.

* * * * *